US011868340B1

(12) United States Patent
Johnson et al.

(10) Patent No.: US 11,868,340 B1
(45) Date of Patent: Jan. 9, 2024

(54) UPDATE PROPAGATION IN A DATA STREAM WAREHOUSE

(71) Applicant: AT&T Intellectual Property I, L.P., Atlanta, GA (US)

(72) Inventors: Theodore Johnson, New York, NY (US); Vladislav Shkapenyuk, New York, NY (US); Divesh Srivastava, Summit, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/815,966

(22) Filed: Jul. 29, 2022

(51) Int. Cl.
*G06F 16/23* (2019.01)
*G06F 16/22* (2019.01)

(52) U.S. Cl.
CPC ...... *G06F 16/2393* (2019.01); *G06F 16/2282* (2019.01); *G06F 16/2322* (2019.01); *G06F 16/2358* (2019.01)

(58) Field of Classification Search
CPC .... G06F 16/211; G06F 16/2393; G06F 16/86; G06F 16/22; G06F 16/2356
USPC .......................................................... 707/717
See application file for complete search history.

(56) References Cited

U.S. PATENT DOCUMENTS

| 7,882,087 | B2 | 2/2011 | Johnson |
| 8,156,083 | B2* | 4/2012 | Banerjee ............... G06F 16/217 707/684 |
| 8,453,155 | B2 | 5/2013 | Golab et al. |
| 8,713,149 | B2 | 4/2014 | Shkapenyuk et al. |
| 8,898,673 | B2 | 11/2014 | Johnson et al. |
| 8,943,107 | B2 | 1/2015 | Johnson et al. |
| 9,235,628 | B2 | 1/2016 | Johnson et al. |
| 9,262,504 | B2 | 2/2016 | Golab et al. |
| 9,600,526 | B2 | 3/2017 | Johnson et al. |
| 9,633,079 | B2 | 4/2017 | Johnson et al. |
| 10,459,910 | B2 | 10/2019 | Johnson et al. |
| 2009/0182779 | A1* | 7/2009 | Johnson ............ G06F 16/24568 |

* cited by examiner

*Primary Examiner* — Hung T Vy
(74) *Attorney, Agent, or Firm* — Amin, Turocy & Watson, LLP

(57) ABSTRACT

Architectures and techniques are presented that can more efficiently update derived data products in response to updated source data. Source data is typically stored in source tables, whereas a materialized view of a query can generate a derived table based on the state of the source tables at the time the query is executed. When source data changes (e.g., in response to late-arriving input data), rather than recomputing the entire derived table (e.g., by again executing the original query, which can be expensive), an invertible relationship between timestamps can be leveraged to identify only those portions of the derived table that are affected by the update. Therefore, a new defining query can be generated to update only those portions of the derived table that are affected by the source data update.

20 Claims, 10 Drawing Sheets

US 11,868,340 B1

UPDATE PROPAGATION IN A DATA STREAM WAREHOUSE

TECHNICAL FIELD

The present application relates generally to techniques for computing a data product from a source data stream and more particularly to efficiently recomputing the data product in response to updated source data.

BACKGROUND

Large-scale data warehouses typically receive continual streams of records from multiple sources. Common types of steams include click streams, network metric streams, log streams, and Call Detail Record (CDR) streams. In most cases, business-ready data sets, referred to herein as a "data product" are derived from these streams.

For example, a mobile network service provider might wish to ensure reliable service to customers in general or in some cases to certain priority customers. In that case, a data product (e.g., derived from raw data metrics and other sources) can identify any customers (or priority customers) affected by a cell tower radio failure or an eNodeB (eNB) failure as one example data product. The source data from which this data product is derived is commonly a collection of Long Term Evolution (LTE) Radio Access Network (RAN) signaling messages and measurement event streams. The actual source data may not be especially useful by itself in a raw from, but various transformations or comparisons with other data can surface high level data products that give useful insight such as this example For instance, by monitoring streams such as internal-per-radio-utilization and additional correlating information, the data processing system can identify radios and/or eNBs that have failed. Measurement streams such as radio resource control (RRC) measurement reports can be used to associate customer user equipment (UE) with particular radios and/or eNBs. The customer UE location streams can then be correlated with the failure streams to determine UEs affected by the failure. Further processing can identify which of these UEs managed to handover to a new radio versus the ones which did not.

Accordingly, it can be beneficial to compute data products from inputs sourced from data streams.

BRIEF DESCRIPTION OF THE DRAWINGS

Numerous aspects, embodiments, objects and advantages of the present application will be apparent upon consideration of the following detailed description, taken in conjunction with the accompanying drawings, in which like reference characters refer to like parts throughout, and in which.

DETAILED DESCRIPTION

Overview

Figure 1:
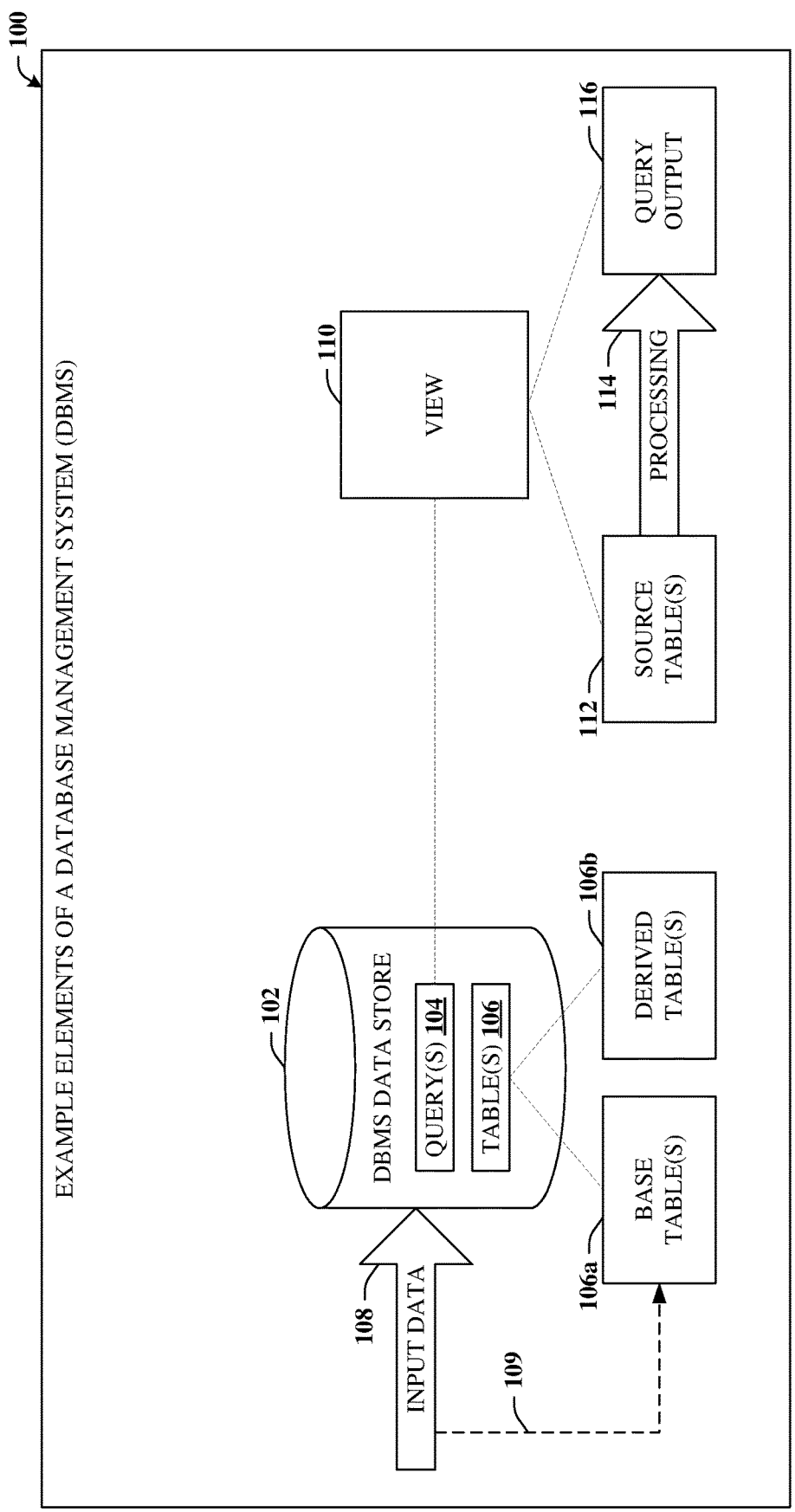
FIG. 1 illustrates a schematic block diagram of an example database management system (DBMS) in the context of a streaming warehouse is presented in accordance with certain embodiments of this disclosure.

As noted in the Background section, it can be beneficial to compute data products (e.g., that offer high-level or business-ready insights) from inputs sourced from data streams (e.g., low level data metric or other details).

However, it is noted that most data streams, such as those detailed above, have a strong temporal component. The records in a stream generally either describe an event (e.g. a radio handover event) that has occurred at a particular time, a measurement (e.g., bytes transmitted over a network interface) over a fixed-size window at a particular time or range, or a summary of a customer interaction (e.g. a call detail record (CDR) that includes the start and stop time of the call). Records in these streams generally arrive in increasing order of at least one of the timestamps, but not always.

When data arrives strictly in time-increasing order, generating derived data products is relatively straightforward. When all input streams have progressed past the next unit of computation (e.g., all data between 2:00 pm to 3:00 pm has arrived), compute it and then wait until the next unit (e.g., 3:00 pm to 4:00 pm) can be computed. However, records in large data streams do not always arrive in timestamp order, for several potential reasons.

One primary reason why records do not always arrive in temporal order is that large data streams gathered from widely distributed geographic locations are very difficult to time synchronize because of various issues including buffer delays, network issues, transient overloads, congestion, and so on. It is very common for the majority of data (e.g., about 80%) to arrive within 5 minutes of an indicated timestamp; most (e.g., about 95%) within 20 minutes, and almost all (e.g. 99.9%) within 18 hours.

Another primary reason why records do not arrive in temporal order is that some data records describe variable-length measurement intervals. Examples include CDRs and Per-Call Measurement Data. These data sets describe a complete customer interaction and are generated only at the completion of the interaction, which can significantly differ from the initiation of the interaction. Most interactions are short (e.g., 60 seconds or less) but some can range into the 10s of hours. Derived data products are affected by the entire time range of the interaction.

Yet another primary reason why records do not arrive in temporal order can be due to a region of the input data being discovered to be faulty. For example, an input file might have been truncated, an incorrect process might have produced the data, and so on. The effects of the faulty data must be removed from the derived data product and then recomputed with the corrected data. These problems might be discovered hours or days after the fact.

Regardless of the cause, the existence of late arriving data complicates the generation of data products. Namely, updates to source data streams directly impact the information provided in the derived data product, which in many cases can be expensive to recompute.

Delayed-Computation Approach

One common solution to late-arriving data in practice is to delay computing derived data products until a desired level of completion has been achieved. For example, if statistical studies have shown that most (e.g., 99%) of the data arrives within 18 hours, then computation of the derived data product can be performed after an 18 hour delay. If more timely data is desired, then two kinds of data products can be generated: fast (e.g., after 20 minutes in which 95% of the data is statistically likely to have arrived), and near-complete (after 18 hours in which 99% of the data is statistically likely to have arrived).

However this solution has certain problems. First, it introduces guaranteed delays into the generation of the derived data products. Second, the scheduling is rigid—data isn't produced faster if the delivery process improves and conversely the derived data products are computed even if insufficient data has arrived.

Streams Approach

A second solution is to use a streams mechanism. When using a streams mechanism, the input data to a derived data product are tracked by a stream. When a new increment of an input is processed, the stream will provide the records of the input source which have not been processed into the derived data product. After processing, the streams are brought up to the latest checkpoint of the input data. This solution also has a few major drawbacks.

One major drawback of the streams technique is that database administrator (DBA) must write the update program based on the nature of the particular derived product. Many important types of queries, such as simple aggregations and inner joins, have simple incremental maintenance programs. While not as simple as the defining query, these update programs can be readily written by a trained DBA. However many common queries do not have simple update programs—outer joins, holistic aggregation (e.g., count distinct), inclusion or exclusion predicates, and so on. Correctly written update programs can require complex logic involving hidden support tables. These programs in general require special expertise in structured query language (SQL) semantics and query processing logic.

Another major drawback of the streams technique is the loss of flexibility in scheduling. In general, all of the stream must be consumed during an update. But in many cases, it is desirable to only consume a part of the stream. As one example, the derived data product might be an inner join between two input streams. Processing one input stream which is ahead of the other is wasted effort. As another example, various problems might lead to an input data source being blocked for a long period of time, e.g., days. It might be desirable to perform catch-up processing gradually to avoid crowding out the other processing which is needed. Many catch-up strategies are possible—one might prefer to process the oldest data first, or one might prefer to process the newest data first and gradually process the older data.

As can be seen, previous delayed-computation approaches and stream approaches have significant drawbacks, particularly in response to updates that arrive late. In certain embodiments, the disclosed subject matter is directed to providing a flexible mechanism for computing derived data products in the presence of late-arriving update data. As will be further detailed herein, the disclosed approach can track updates to data products, and use metadata about these updates, especially, but not limited to the timestamps involved to compute the updates to the data products. For example, by applying such a process to every managed table in a principled manner, arbitrary chains of derived data products can be maintained transparently. As an additional benefit, the update process can be readily available for analysis, reports, dashboards, and so forth.

The disclosed approaches offer several advantages of previous approaches. For example, with regard to the previous delayed-computation approach, the disclosed approach can provide the following advantages. Derived data products can be produced with minimal delay. In many cases, for instance with respect to operations management and troubleshooting, the most recent data can be valuable even if the data is not complete (e.g., not all updates have arrived). Thus, an update to a data product can be scheduled early if it is determined that sufficient data has arrived.

Conversely, the update can occur later in time if it is determined that insufficient data is available. Hence, flexible scheduling of data product updates can provide significant advantages over previous delayed-computation approaches. Furthermore, chains of derived data products can be handled in a more flexible manner Recall, in the delayed-computation approach, a specific schedule must be followed, e.g., update A 2:00-3:00, followed by update B 2:00-3:00, and then update C 2:00-3:00. Moreover, catch-up processing and faulty data recovery can be scheduled automatically instead of manually.

With regard to the previous streams approaches, the disclosed approach can provide the following advantages. Namely, the updates to the derived data product can use the defining query of the derived data products as does the delayed computation approach. This advantage can allow exact testing of the transformation before installation of the new derived data product. Such can greatly reduce the time and effort required to implement a new derived data product. Such can further enable the full use and reliance on database management system (DBMS) query optimizer. Furthermore, update scheduling can be flexibly implemented.

It is noted that a database administrator (DBA) can specify how an input affects a derived data product. However, in most cases, this specification is relatively straightforward (and therefore can be automated), and a DBA can be readily trained to produce this specification. Therefore, the cost of training and maintenance can be significantly reduced by as much as 65% to 80% or more.

In some embodiments, the updates to the derived table may not in general be the minimal possible updates as compared to previous streams approaches. However, the approaches disclosed herein can be bulk-oriented and allow full use of the DBMS query optimizer. Furthermore, in modern cloud data warehouse systems, these systems typically rely on large (e.g., 100 MB), write-once partitions. If a single byte in the data partition is modified, a new copy is written. This property may reduce the performance advantages of small, incremental updates over bulk updates.

Stream Warehouse Concepts

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

In order to better describe the disclosed subject matter, it can be instructive to consider certain streaming warehouse concepts, an example of which can be found at FIG. 1.

With reference now to FIG. 1, a schematic block diagram of an example database management system (DBMS) 100 in the context of a streaming warehouse is presented in accordance with certain embodiments of this disclosure. DBMS 100 can comprise a DBMS data store 102. DBMS data sore 102 can comprise one or more stored queries 104 and one or more tables 106. A given table 106 can be representative of either base a table 106a or a derived table 106b, which are further detailed below.

DBMS data store 102 can receive input data 108, which can be raw data, low-level data, or any suitable data that is stored to a stream warehouse and/or to DBMS 100. Common examples can include click streams, network metric streams, log streams, Call Detail Record (CDR) streams, or any other suitable data. This input data 108 can be leveraged to generate derived data products (e.g., high-level and/or business ready visualizations). Input data 108 is typically loaded to one or more base tables 106a, as illustrated by reference numeral 109. On the other hand, derived table(s) 106 are distinct from base tables 106a in that derived tables 106b store data from a previously existing table, be it a previously existing base 106a or a previously existing derived table 106b.

The process of loading data into a data warehouse has traditionally been described as ETL (Extract, Transform, Load). When input data 108 is supplied to a warehouse (e.g., DBMS 100), a number of steps were historically taken outside of the warehouse to preprocess the data, generally performing data cleaning and normalization steps. However, a more modern approach is described as ELT (Extract, Load, Transform). While some minor preprocessing can be done on input data 108, it is generally expected that most processing is done in the warehouse (e.g., by DBMS 100). This later approach allows the automatic use of compute clusters and leverages the power of high level languages such as Structured Query Language (SQL) to perform data maintenance tasks.

Input data 108 that can be loaded from an input source (not shown) such as a file, a Kafka queue, and so forth, can be placed directly in base table 106a. Because only minimal processing is performed on input data 108 in the ELT approach, there is generally a close correspondence between records of the input source and records in the associated base table 106a. Further processing is generally done to create business-ready data sets—subsetting, aggregation, enrichment with other data sources, and so on. Following such further processing, additional tables can be created, which are referred to as derived tables 106b. In other words, base tables 106a tend to store records describing input data 108, whereas derived tables 106b tend to store records that include some further processing.

A derived table can be computed from other base and derived tables sometimes along with additional static enrichment tables, such as zip code mappings, or the like. Setting aside the static enrichment tables, the collection of base tables 106a and derived tables 106b can form a directed acyclic graph. The roots of the graphs can be base tables 106a, and the leaves are generally derived tables 106b, but can also be a base table 106a if no derived table 106b is computed from it.

In database terminology, a view (e.g., view 110) is a stored query (e.g., query 104) over one or more source tables 112 in DBMS data store 102. Thus, source tables 112 can be any of tables 106. Put another way, source tables 112 can be base tables 106a, derived tables 106b, or a combination thereof. In some embodiments, source table(s) 112 are specified by query 104. Likewise, query 104 typically specifies some type of processing 114 that is to be performed on the data of source tables 112, after which query output 116 is generated. However, it is to be appreciated that the type of query output 116 can depend on the type of view 110, which is further detailed in connection with FIG. 2.

Figure 2:
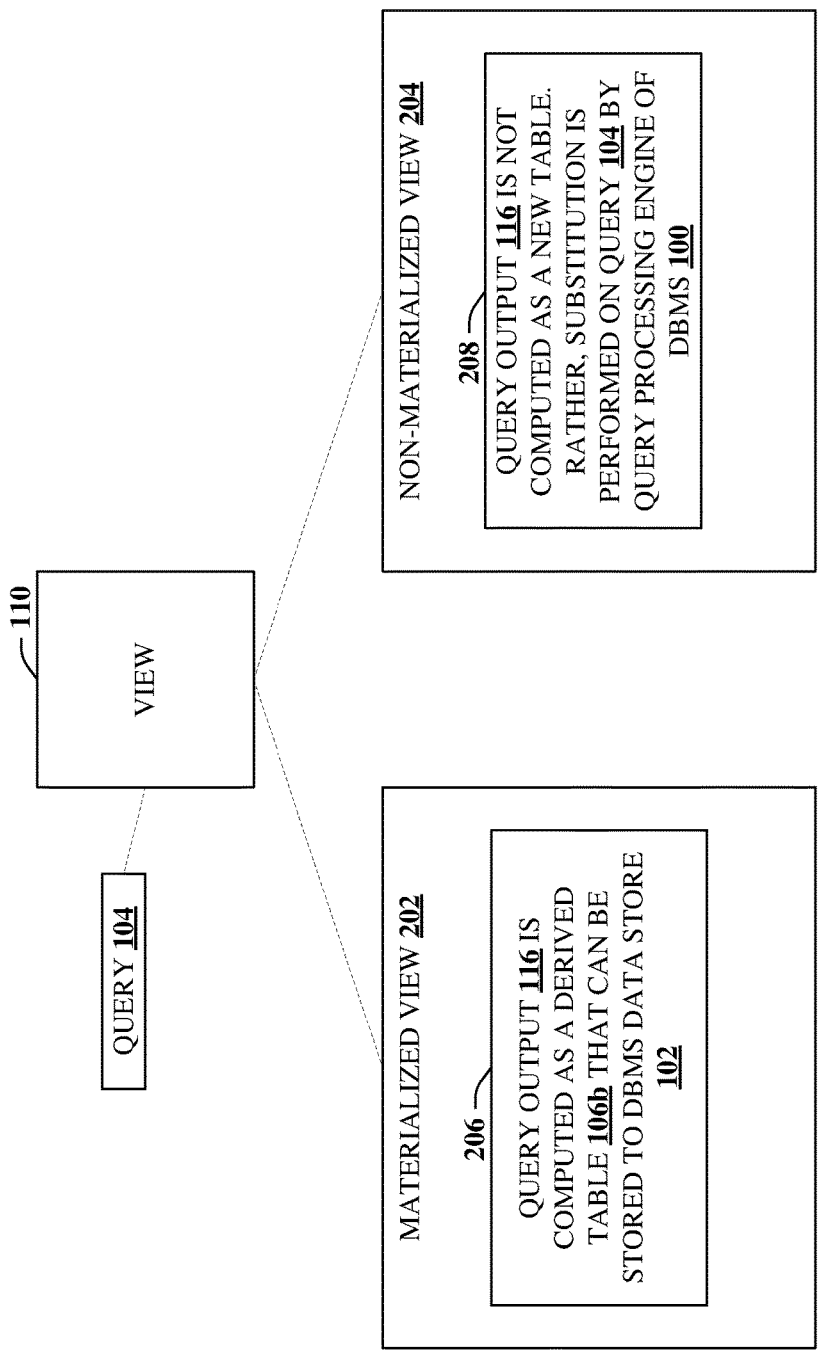
FIG. 2 shows a schematic block diagram 200 that illustrates various comparisons between a materialized view and a non-materialized view in accordance with certain embodiments of this disclosure.

While still referring to FIG. 1, but turning now as well to FIG. 2, a schematic block diagram 200 is presented. Diagram 200 illustrates various comparisons between a materialized view and a non-materialized view in accordance with certain embodiments of this disclosure. As indicated previously, view 110 can represent a stored query 104 over certain source tables 112. In other words, some processing 114 is applied to data in source tables 112 in order to generate query output 116.

If view 110 is a materialized view 202, then query output 116 can be in accordance with materialized view output 206. If view 110 is a non-materialized view 204, then query output 116 can be in accordance with non-materialized view output 208. In the case of materialized view output 206, query output 116 is computed as a derived table 106b that can be stored to DBMS data store 102 and can also be, itself, subsequently queried. Materialized views can be preferred for a variety of reasons. For example, the processing involved to generate query output 116 may be significant and therefore it may be more efficient in terms of resources to store query output 116 as its own table (e.g., derived table 106b). Another reason is that storing the query output 116 as a derived table 106b allows ready export of the processed information to third parties (e.g., third parties that do not have access to source tables 112, or for other reasons).

In contrast, if view 110 is a non-materialized view 204, then query output 116 can be in accordance with non-materialized view output 208. In the case of non-materialized view output 208, query output 116 is not computed as a new table. Rather, substitution is performed on query 104, e.g., by a query processing engine of DBMS 100. In other words, if view 110 is a materialized view 202, then a new derived table 106b is created. But if view 110 is a non-materialized view 204, then no new table 106 is created.

To provide a concrete example, consider a CUSTOMER table (e.g., table 106). For example, suppose the CUSTOMER table contains customer information, including name, customer type, and credit card information, which can be described as:

CUSTOMER(FirstName, LastName, AccountType, CreditCardNo)

The CUSTOMER table can be used to assist with the checkout process in an ecommerce application. Data from the CUSTOMER table can also be used for standard analytics such as to indicate how many customers of each type (e.g., AccountType) there are.

However, it should be understood that supplying the CUSTOMER table to a third party, potentially even including the analytics team, poses a security problem, as the CreditCardNo field contains sensitive information. A solution is to provide the analytics team (or another third party entity) with a different view, which is referred to herein as the SAFECUST view. The SAFECUST view can be defined as follows:

Select Firstname, LastName, AccountType from CUSTOMER

The analytics team can be provided with access privileges to the SAFECUST view rather than the CUSTOMER table, allowing customer analytics to be performed without revealing sensitive information.

As introduced in FIG. 2, a view can be a materialized view 202 or a non-materialized view 204. As indicated, materialized view output 206 can represent a table computed from the source table(s) 112 and stored in the DBMS 100 as its own table. On the other hand, a non-materialized view output 208 is not computed. Instead substitution is performed in the query processing engine. For example, if SAFECUST is a non-materialized view 204, then the query:

Select AccountType, count(*) from SAFECUST

Is transformed into, e.g., Select v.AccountType, count(*) from (Select Firstname, LastName, AccountType from CUSTOMER) v before execution. To reiterate, because SAFECUST is a non-materialized view 206, there is no associated table to query as would have been the case if SAFECUST was instead a materialized view 202. Therefore, the query processing engine can convert the above query, potentially automatically.

Unlike materialized views 202, non-materialized views 204 are always up-to-date, because they are queries on the sources tables 112, and therefore associated query output 116 always reflects the current state of the source tables 112.

In contrast, it is to be understood that in the case of materialized views 202, view maintenance is needed if source tables 112 are updated after query output 116 is generated, since the associated derived table 106b was generated based on the state of the source tables 112 at the time the associated query 104 was executed. Put another way, since a materialized view 204 represents a derived table 106b that was generated from source tables 112 at a certain point in time, should data from those source tables 112 be subsequently updated, such can necessitate a corresponding update to the data of the derived table 106b. For example, if a new customer creates an account, the customer is entered into the CUSTOMER table. At some point, this new customer should also appear in the SAFECUST table to ensure accurate analytics.

There are many strategies for maintaining a materialized view. One such strategy, referred to herein as a naïve approach, is to completely recompute the materialized view (e.g., recompute the associated derived table 106b) when the source(s) (e.g., source table 112) changes. However this strategy can consume excessive resources if the table is large but the changes are small. Further, one significant reason to rely on materialized views 204 in the first place was to avoid repeat of the significant processing used to generate the derived table 106b.

Some materialized views are incrementally maintainable, meaning that there are efficient programs to compute the materialized view using only the updates to the sources. The SAFECUST view in the example above is incrementally maintainable, as any insert, delete, or modify operation on CUSTOMER is readily translated into an operation on SAFECUST.

If a materialized view is incrementally maintainable, then the DBMS can readily generate efficient programs for its maintenance. Unfortunately, many queries do not result in incrementally maintainable views. In this case, the materialized view must be completely recomputed, or some other strategy must be employed. Techniques disclosed herein are, in certain embodiments, directed to approaches in which elements of a materialized view are not incrementally maintainable, but for which completely re-computing the materialized view is not required, which represents a significant improvement over the naïve approach.

Example Systems

Figure 3:
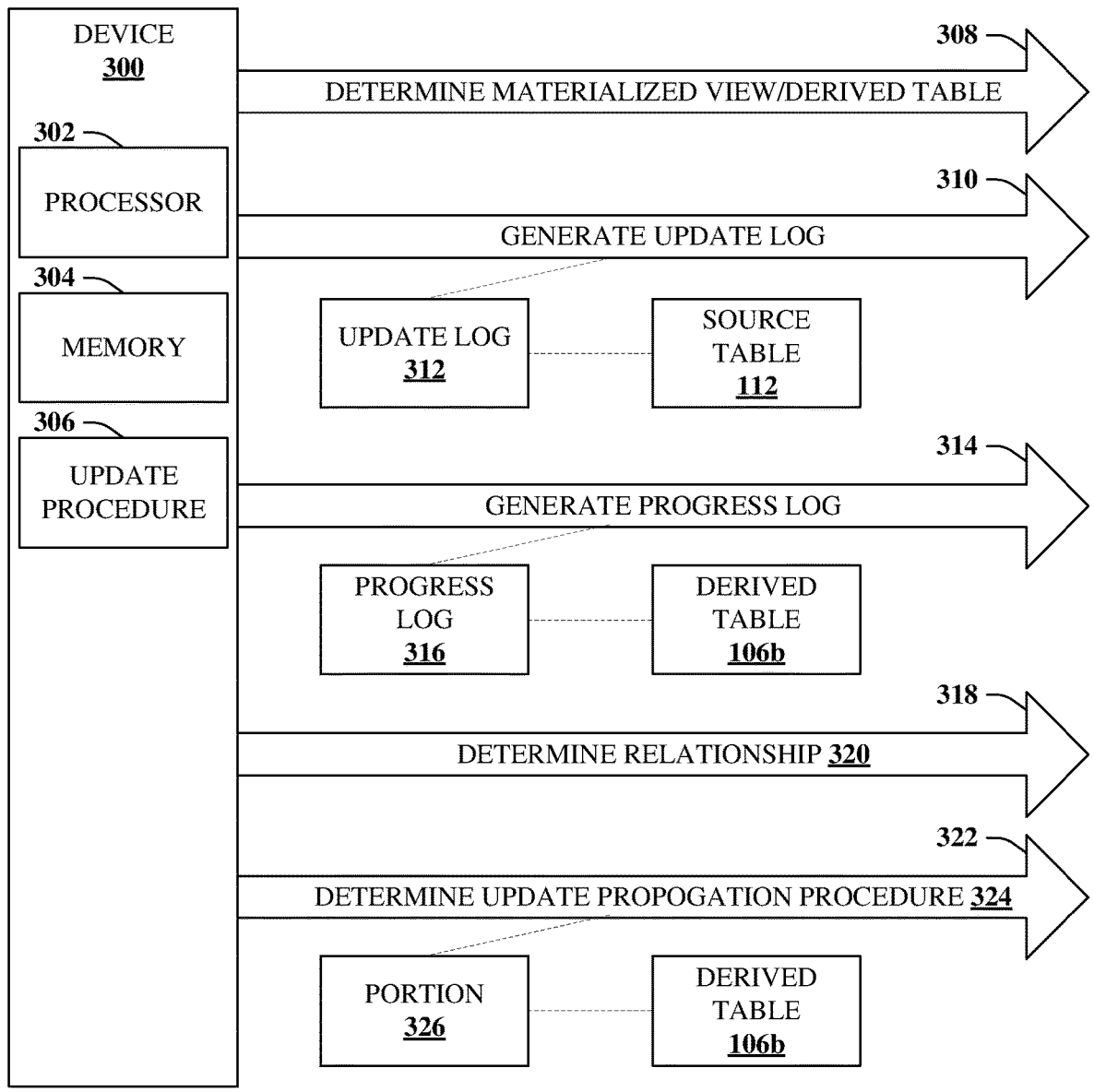
FIG. 3 depicts a schematic block diagram is illustrating an example device that can determine portions of derived tables to recompute in response to source table updates in accordance with certain embodiments of this disclosure.

Referring now to FIG. 3, a schematic block diagram is depicted illustrating an example device 300 that can determine portions of derived tables to recompute in response to source table updates in accordance with certain embodiments of this disclosure. For example, device 300 can be part of a DBMS such as DBMS 100 or part of a streams data warehouse. Device 300 can comprise a processor 302 that can be specifically configured to provide efficient re-computation of derived tables in accordance with update procedure 306. Device 300 can also comprise memory 304 that stores executable instructions that, when executed by processor 302, can facilitate performance of operations. Processor 302 can be a hardware processor having structural elements known to exist in connection with processing units or circuits, with various operations of processor 302 being represented by functional elements shown in the drawings herein that can require special-purpose instructions, for example, stored in memory 304 and/or an update procedure 306 component or circuit. Along with these special-purpose instructions, processor 302 and/or device 300 can be a special-purpose device. Further examples of the memory 304 and processor 302 can be found with reference to FIG. 10. It is to be appreciated that device 300 or computer 1002 can represent a server device of a streams warehouse, a communications network, or other device that can be used in connection with implementing one or more of the systems, devices, or components shown and described in connection with FIG. 3 and other figures disclosed herein.

Generally speaking, many large data sets stored in a data warehouse have a temporal nature, meaning that there is there is a timestamp attached to the record. Many such records describe events, for example a table of ecommerce purchases or user equipment (UE) handovers between cellular antennas. Other records describe measurements over a fixed interval of time. For example, simple network management protocol (SNMP) records might report interface traffic every five minutes. Still other records can have multiple timestamps. For example, Call Detail Records describe a telecom session, and have both a start time and an end time.

These types of data warehouses generally make use of the timestamps to aid in table management. Tables often keep a rolling window of e.g., 3 months; records whose timestamp are 3 months or more in the past can be dropped during a periodic cleaning activity. To assist in the cleanup, records can be placed in partitions based on their timestamp. For example, records might be placed in hourly partitions. Dropping expired records then becomes the relatively inexpensive process of dropping expired partitions. Further, the computation of some derived data products can be helped by this partitioning. For example, an hourly aggregate table can be computed from these hourly partitions.

In a streaming warehouse, data arrives continually, flows into the base tables, and updates the derived tables can then be processed. The vagaries of the arrival process make the computation of the derived tables trickier, but if the arriving data is time-ordered, then various simple strategies can be applied. For example, one could track the maximum timestamp in each unit of arrival. The difference between the current and previous maximum timestamp indicates the portion of the derived table which should be computed.

However, as noted above in most real-life data streams, records can arrive with unpredictable time lags. In this case, determining the portion of a dependent derived table which needs to be updated is a challenging task when arbitrary queries define the materialized views.

Many modern DBMS do not make use of user-adjustable data partitions. Instead the DBMS manages the data partitions of a table internally. This approach allows the DBMS to optimize partition management, and removes an administration burden from the DBA. However, this approach means that previous solutions may no longer apply. Advantageously, the techniques detailed herein provide, inter alia, new update management techniques that can be used with a modern DBMS that do not support user-adjustable data partitions.

Still referring to FIG. 3, device 300 can make determination 308. Determination 308 can relating to determining that a materialized view (e.g., materialized view 202), which can be representative of a stored query (e.g., query 104) of a DBMS such as DBMS 100, has produced a derived table (e.g., derived table 106*b*) that stores derived table data derived from one or more source table(s) (e.g., source table 112) that in turn stores source table data.

At reference numeral 310, device 300 can generate update log 312. Update log 312 can be representative of a history of updates to the source table 112. At reference numeral 314, device 300 can generate progress log 316. Progress log 316 can be representative of a history of updates to the derived table 106*b* resulting from processing of the updates to the source table 112. In other words, as used herein, update log 312 is generally described in the context of source tables 112, whereas progress log 316 is generally detailed in the context of resultant derived tables 106*b*. As can be readily observed, updates that exist in a given update log 312, but have not yet been processed by an associated progress log 316 represent data that can be targeted for the disclosed update techniques.

However, as was previously discussed, a given source table 112 can be a base table 106*a* into which input data 108 is loaded, but can also be a previously derived table 106*b*. Hence, derived tables 106*b* can also have associated update logs 312. Likewise, in some embodiments, base tables 106*a* can have a progress log 316 (e.g., a base progress log) that can record associated source files that have been applied. Such can be used in the cases in which there is no other mechanism to ensure single loading is available.

Furthermore, it is appreciated that the term "generate" as applied to reference numerals 310, 314, and elsewhere, is intended to mean that the logs are created, but can also refer to updating the associated log or verifying the existence of the associated log, such as in the case that the associated log already exists.

At reference numeral 318, device 300 can determine relationship 320. Relationship 320 can represent a timestamp relationship between a source table timestamp field (e.g., a field extant in a record of source table 112) and a derived table timestamp field (e.g., a field extant in a record of derived table 106*b*). In some embodiments, relationship 320 can be an invertible relationship. An invertible relationship 320 is one in which the inverse transform is specified without requiring a reverse transform relationship to be specified. Additional detail with respect to relationship 320 can be found with reference to FIGS. 4 and 5.

At reference numeral 322, device 300 can determine update propagation procedure 324. Update propagation procedure 324 can be performed in response to a determination that an update has occurred to the source table data. For example, if no associated record exists in progress log 316, then such can be indicative that the update should be processes. Update propagation procedure 324 can determine a portion 326 of a derived table 106*b* to be recomputed in response to the update to the source table data. Additional detail relating to update propagation procedure 324 can be found at FIG. 4, which can now be referenced.

Figure 4:
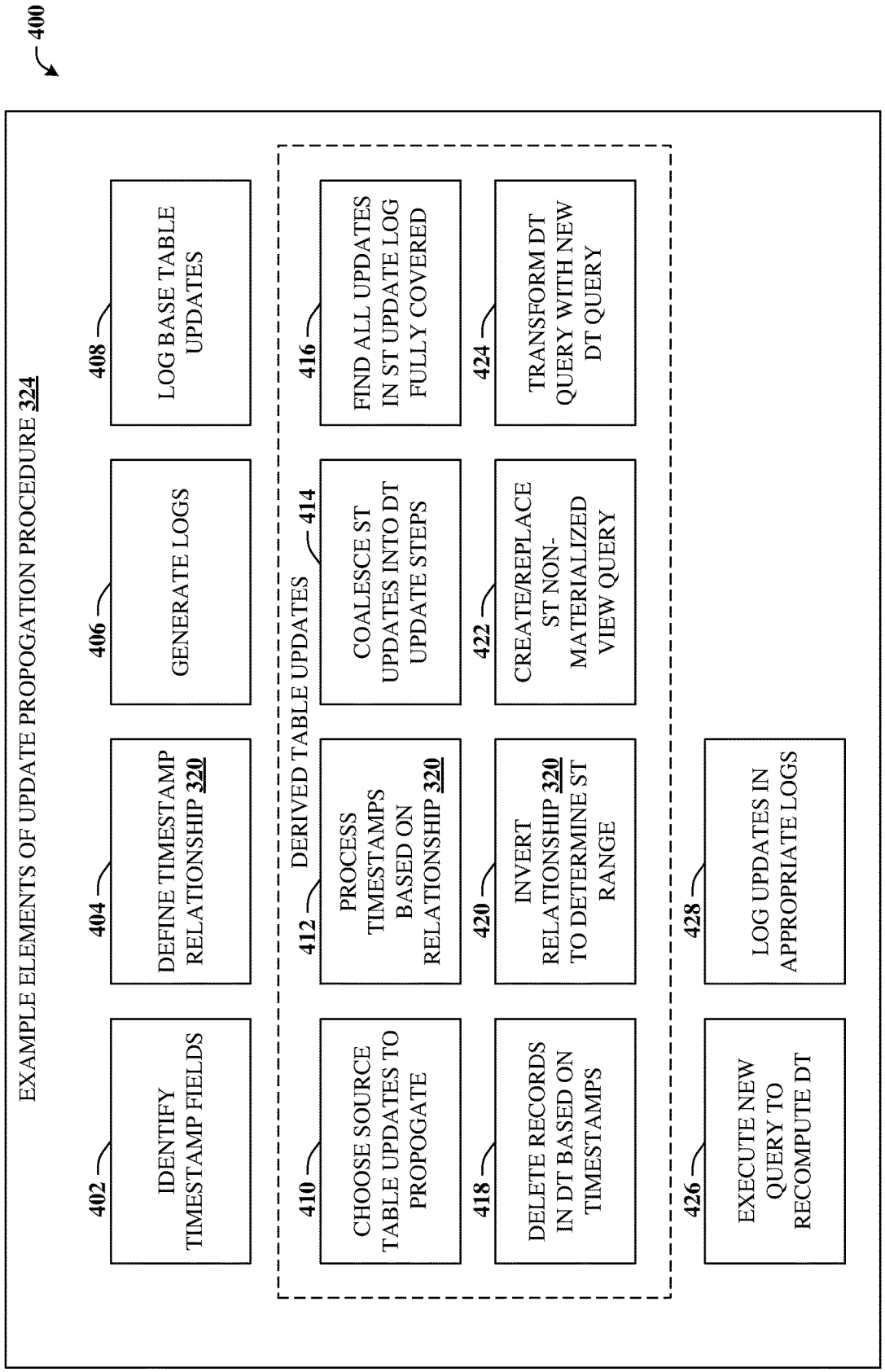
FIG. 4 depicts a schematic block diagram illustrating example elements of the update propagation procedure in accordance with certain embodiments of this disclosure.

Referring now to FIG. 4, a schematic block diagram 400 is depicted illustrating example elements of the update propagation procedure 324 in accordance with certain embodiments of this disclosure. For example, at reference numeral 402, update propagation procedure 324 can identify timestamp fields. As an example, an associated timestamp field can be identified for each base table 106*a* and each derived table 106*b*.

At reference numeral 404, update propagation procedure 324 can define timestamp relationship, which can be substantially similar to relationship 320 detailed with respect to determination 318 of FIG. 3. In more detail, for each derived table 106*b*, relationship 320 can be defined between the timestamps of derived table 106*b* and those of an associated source table 112. Additional detail relating to relationship 320 and invertible properties can be found with reference to FIG. 5.

At reference numeral 406, update propagation procedure 324 can generate various logs. Such can be inclusive of reference numerals 310 and 314 of FIG. 3. For instance, for table 106, create a log of the updates that have been applied to that table 106. Such can be represented by update log 312. Additionally, for each derived table 106*b*, create a log of the source table 112 updates (e.g., those found in that source table's update log 312) processed by the derived table 106*b* updates. Such can be represented by progress log 316.

At reference numeral 308, update propagation procedure 324 can log base table updates. For instance, when a base table 106*a* is updated, log the update including the minimum and maximum timestamp of the records in the update of the table's update log. While reference numeral 408 specifically refers to updates to base table 106*a* and/or source table 112 updates reflected in an associated update log 312, reference numerals 410-424 specifically refer to derived table 106*b* updates.

At reference numeral 410, when a derived table, D (also referred to as DT), is updated, update propagation procedure 324 can choose a collection of source table, S, (also referred to as ST) updates to propagate. It is observed that members of the collection should be updates that have not been previously processed. That is, these updates are in the source table's update logs 312, but not in the derived table's progress log 316.

At reference numeral 412, update propagation procedure 324 can process timestamps based on relationship 320. As an example, for each source table update in the collection, update propagation procedure 324 can process the minimum and maximum timestamps of the update log 312 record. By using the timestamp relationship 320 between source table(s) 112 and derived table 106b, this minimum and maximum found in the source table 112 can be used to identify the minimum and maximum (e.g., dts_min and dts_max) timestamps in the derived table that can be affected by the source table update. This range bounded by dts_min and dts_max can be referred to as portion 326 discussed in FIG. 3.

At reference numeral 414, update propagation procedure 324 can perform a coalesce procedure that combines an update with other updates to the source table data. For example, coalesce procedure can coalesce source table 112 updates into a collection of derived table 106b update steps. Initially, each source table update can be treated as an update step. Various rules can be used to perform this can be used to perform this coalescing, but one example can be the following.

If the minimum and maximum timestamps of two distinct steps, s1 and s2, show an overlap in time, then combine them into a new step with timestamps min(s1.dts_min, s2.dts_min), max(s1.dts_max, s2.dts_max). Table I, below provides additional detail relating to the coalesce procedure.

For example, suppose a given derived table 106b, D, is defined by the following query 104:
Select coalesce(sLk, s2.k), coalesce(s1.timestamp, s2.timestamp), s1.v, s2.v
From S1 s1 FULL OUTER JOIN S2 s2 On s1.k=s2.k and s1.timestamp=s2.timestamp In this case, there are two source tables 112, S1, S2. S1, S2, and D each have an update logs 312, respectively referred to as S1_updates, S2_updates, and D_updates. At least the derived table 106b, D, has a progress log 316, referenced as D_progress. Update logs 312 can have a schema reflected by (update_id, ts_min, ts_max) while the progress log 316 can have a schema defined as (source_table, update_id).

The relationship between D.timestamp and S1.timestamp/S2.timestamp is relatively straightforward: D.timestamp=S1.timestamp/D.timestamp=S2.timestamp.

Suppose the entries of the following table are in the source table update logs 312, but not in D's progress log 316:

TABLE I

| S1 | S2 |
|---|---|
| Uid = A, ts_min = 100, ts_max = 110 | Uid = Y, ts_min = 120, ts_max = 130 |
| Uid = B, ts_min = 110, ts_max = 150 | Uid = Z, ts_min = 140, ts_max = 170 |
| Uid = C, ts_min = 160, ts_max = 180 | |
| Uid = D, ts_min = 200, ts_max = 220 | |

Suppose all of these updates are selected to propagate into D (e.g., via the choosing operation of reference numeral 410). In accordance with one example coalesce procedure (and reference numeral 414), updates A and B coalesce into update step u1 with ts_min=100, ts_max=150. In this case, such is due to the fact that ts_max of update A overlaps with ts_min of update B given the value of 110. Update step u1 also coalesces with update Z from u2 with ts_min=100, ts_max=170. Step u2 coalesces with update C to form step u3 with ts_min=100, ts_max=180. However, update D does not coalesce with u3, so the final step is u4 with ts_min=200, ts_max=220. Steps u1 and u2 were coalesced so they do not need to be processed and the final list of update steps is u3 and u4.

The source updates of u3 are (A, B, C, Y, Z) while the source updates of u4 are (D). Note that while Y was never used to coalesce an update step, it is subsumed by u3. Such can be representative of reference numeral 416. For instance, for a given update step, update propagation procedure 324 can find all updates in the source tables update logs 312 that are completely covered by the min and max timestamps of the associated update step, in this case u3. Such can be indicative of the source updates of the update step.

In terms of derived updates, reference numerals 418-424 can represent techniques that can be applied for each update step. Initially, at reference numeral 418, update propagation procedure 324 can delete, from the derived tables 106b, records whose timestamp is between u.dts_min and u.dts_max (e.g., portion 326).

In the context of the example utilized in connection with Table I, update step u3 can be implemented to delete the appropriate records by executing the following:

Delete from D where timestamp>=100 and timestamp<=180

Next to be describe, at reference numeral 420, update propagation procedure 324 can invert relationship 320 to determine source table 112 time ranges. In more detail, as an example, for each source table, S, update propagation procedure 324 can determine the range of timestamps of the source table records (e.g., S.min_ts, S.max_ts) which can contribute to records in the derived table 106b whose timestamp is between u.dts_min and u.dts_max (e.g., portion 326). As indicated, such can be accomplished by inverting the relationship 320 between timestamps of source table(s) 112 and derived table 106b.

At reference numeral 422, for each source table, S, update propagation procedure 324 can create/replace non-materialized views 204, VS. As a representative example, VS, can be replaced with the following query 104:

Select*from S where S.timestamp>=S.min_ts and S.timestamp<=S.max_ts

In more detail and within the context of the example provided in connection with Table I having two source tables 112, two new views can be created or replaced:

Create or Replace VS1 as Select*from S1 where timestamp>=100 and timestamp<=180;

Create or Replace VS2 as Select*from S2 where timestamp>=100 and timestamp<180

At reference numeral 424, update propagation procedure 324 can transform derived table 106b query 104, Q, with a new derived table query 104, Q2. As one example, initially, an intermediate query, Q1, can be created. For each source table, S, replace, within Q1, each reference to S with a reference to VS, which, recall is a non-materialized view 204 that does not compute a table 106. Q2 can be created according to the following:

Insert Into D (select*from (Q1) q where q.timestamp>=dts_min and q.timestamp<=dts_max In more detail and within the context of the example provided in connection with Table I having two source tables 112, the defining query, Q, can be transformed into Q2 according to the following:

Insert into D select*from (Select coalesce(s1.k, s2.k), coalesce(s1.timestamp, s2.timestamp), s1.v, s2.v From VS1 s1 FULL OUTER JOIN VS2 s2 On (s1.k=s2.k and s1.timestamp=s2.timestamp $q$ where $q$.timestamp>=100 and $q$.timestamp<=180

At reference numeral 426, update propagation procedure 324 can execute the new query, Q2 in order to recompute derived table 106b. At reference numeral 428, update propagation procedure 324 can log updates in appropriate logs. For example, update step u can be logged in D's update log 312 and source updates of u can be logged in D's progress log 316 and so on. In the context of the example in connection with Table I, such can result in executing Q2, then insert (W, 100, 180), into D_updates and insert ((S1, A), (S1, B), (S1, C), (S2, Y), (S2,Z)) into D_progress.

Figure 5:
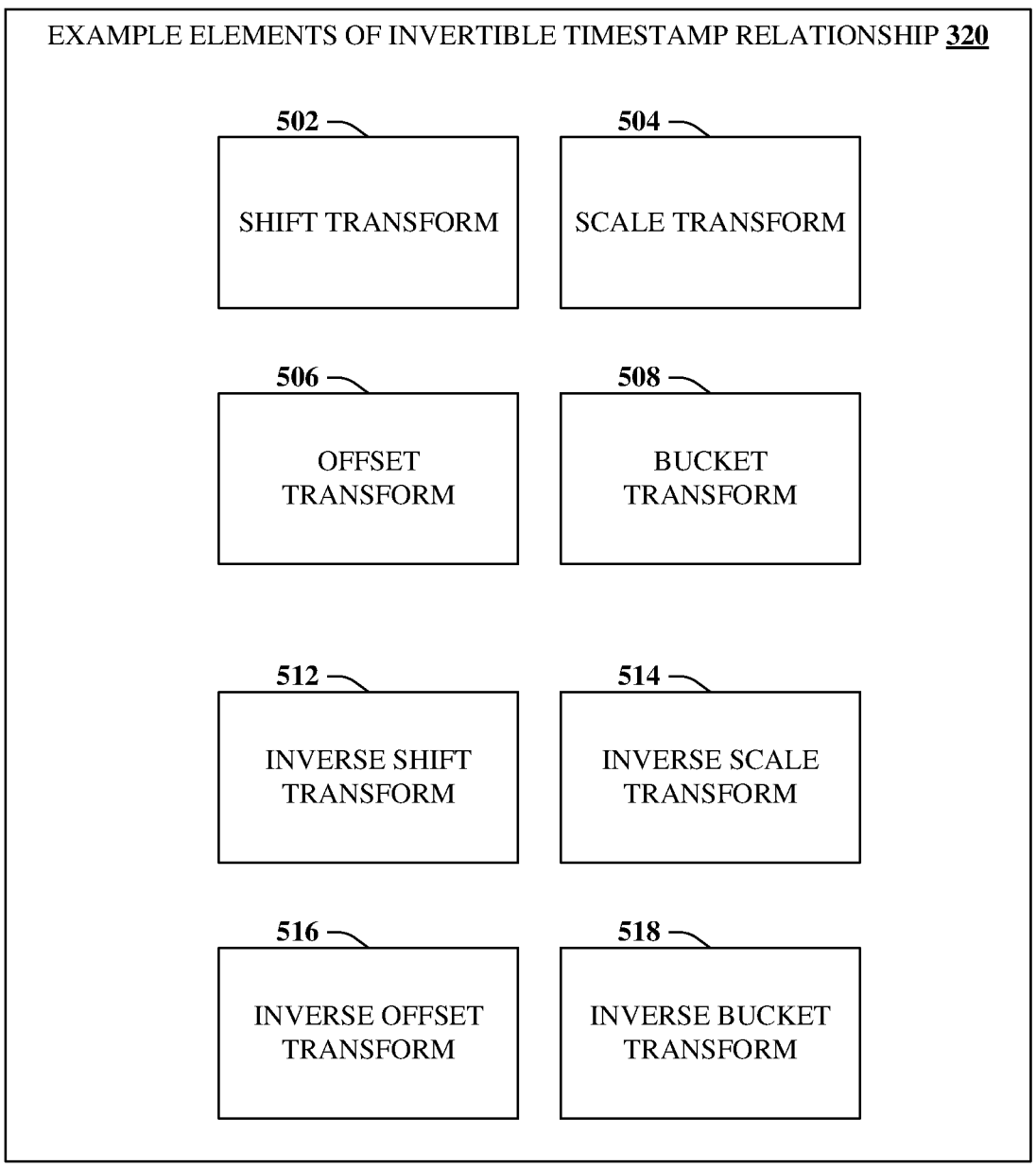
FIG. 5 shows a schematic block diagram illustrating example elements of an invertible timestamp relationship in accordance with certain embodiments of this disclosure.

With reference now to FIG. 5, a schematic block diagram 500 is depicted illustrating example elements of invertible timestamp relationship 320 in accordance with certain embodiments of this disclosure. As is readily appreciated, the relationship (e.g., relationship 320) between source tables 112 and derived tables 106b is a significant component of update propagation procedure 324. Such was deliberately simplified in much of the description above, including the walkthrough example in connection with Table I in order to emphasize operation of other parts of update propagation procedure 324. Hence, diagram 500 is intended to describe relationship 320 in greater detail.

In general, relationship 320 (e.g., between timestamps of source table 112 and those of derived table 106b) can be described by a pair of functions. For example:

$D.ts\_min = xform\_min(P\_DS, S.ts\_min)$ $D.ts\_max = xform\_max(P\_DS, S.ts\_max)$ Where P_DS is a set of parameters that defines the timestamp relationship such as relationship 320. The functions xform_min and xform_max detailed here can be used in connection with techniques introduced at reference numeral 412 of FIG. 4. This relationship typically needs to be invertible for proper operation of the techniques introduced at reference numeral 420 of FIG. 4:

$S.ts\_min = inv\_xform\_min(P\_DS, D.ts\_min)$ $S.ts\_max = inv\_xform\_max(P\_DS, D.ts\_max)$ While there are many ways to define the forward and inverse transform, here, we describe one possible set of subfunctions that can be combined into needed functions. In this discussion, we assume that all timestamps are integers, though other data types such as Date can be supported. We now address various subfunctions one at a time, with reference to shift transform 502, scale transform 504, offset transform 506, and bucket transform 508. These subfunctions can be applied in a sequence such as shift, scale, offset, bucket.

As an example, shift transformation 502 can be used, e.g., to provide time zone transforms and so on. If the shift parameter is v, then:

$D.ts\_min = S.ts\_min + v$ $D.ts\_max = S.ts\_max + v$

As note, for an invertible relationship 320, the inverse shift transform 512 can be applied by instead subtracting v.

Scale transform 504 can be used convert between timestamps having different formats, e.g., to convert between a timestamp in seconds and a timestamp in milliseconds. Assuming that the shift parameter is v, then the conversion is:

If $v>1$:

$D.ts\_min = S.ts\_min * v$ $D.ts\_max = S.ts\_max * v + ceiling(v) - 1$

If $v<1$:

$D.ts\_min = S.ts\_min * v$ $D.ts\_max = S.ts\_max * v$

The inverse scale transform 514 can be specified to instead use 1/v.

Offset transform 506 can involve a pair of parameters, forward and backward. This transform can be used for predicates such as S1.timestamp between S2.timestamp-backward and S2.timesteamp+forward with S1.timestamp serving as D's timestamp.

$D.ts\_min = S.ts\_min - backward$ $D.ts\_max = S.ts\_max + forward$

The inverse offset transform 516 can be specified by swapping forward and backward.

The bucket transform 508 can be used when aggregating data into time windows or partition, such as, e.g., when aggregating event data into hourly (or daily, and so on) summaries $D.ts\_min = v * floor(S.ts\_min / v)$ $D.ts\_max = v * floor(S.ts\_max / v)$ The reverse bucket transform 518 can be specified as:

$S.ts\_min = v * floor(D.ts\_min / v)$ $S.ts\_max = v * floor(D.ts\_max / v) + v - 1$ What has been described above can facilitate techniques to efficiently update derived tables 106b in the face of subsequently arriving source data in an intelligent and principled manner that is more efficient that the naïve approach of simply recomputing the entirety of the derived table 106b. While derived table 106b represents a materialized view 202, non-materialized views 204 can be powerful tools used in database management. In addition to what has been detailed above with respect to non-materialized views 204, it should be appreciated that non-materialized views 204 can be incorporated into the data flow of update propagation procedure 324 or in connection with other techniques or elements.

For example, suppose that a derived table, D, is sourced from non-materialized view, V, with the transformation parameters P_DV. Let V be dependent on sources S1 through Sv. In that case, the dependency of D on V can be removed. For each S in S1 through Sv do the following:

Add a dependency of D on S with the composition of parameters P_DV and P_VS $D.ts\_min = xform\_min(P\_DV, xform\_min(P\_VS, S.ts\_min))$ $D.ts\_max = xform\_max(P\_DV, xform\_max(P\_VS, S.ts\_max))$ Then, repeat the above until D is no longer dependent on a non-materialized view.

Example Methods

Figure 6:
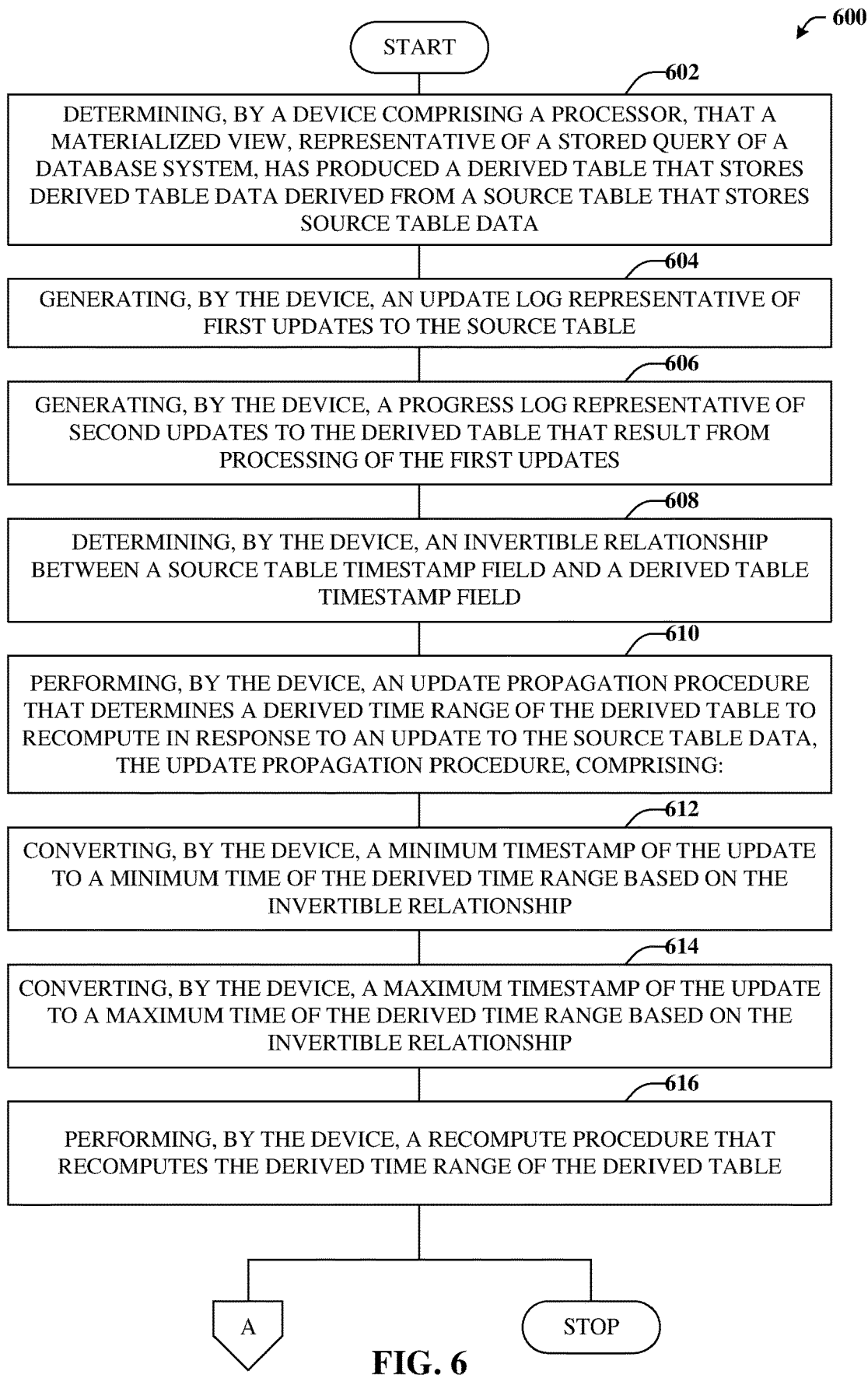
FIG. 6 illustrates an example method that can determine portions of derived tables to recompute in response to source table updates in accordance with certain embodiments of this disclosure.
Figure 7:
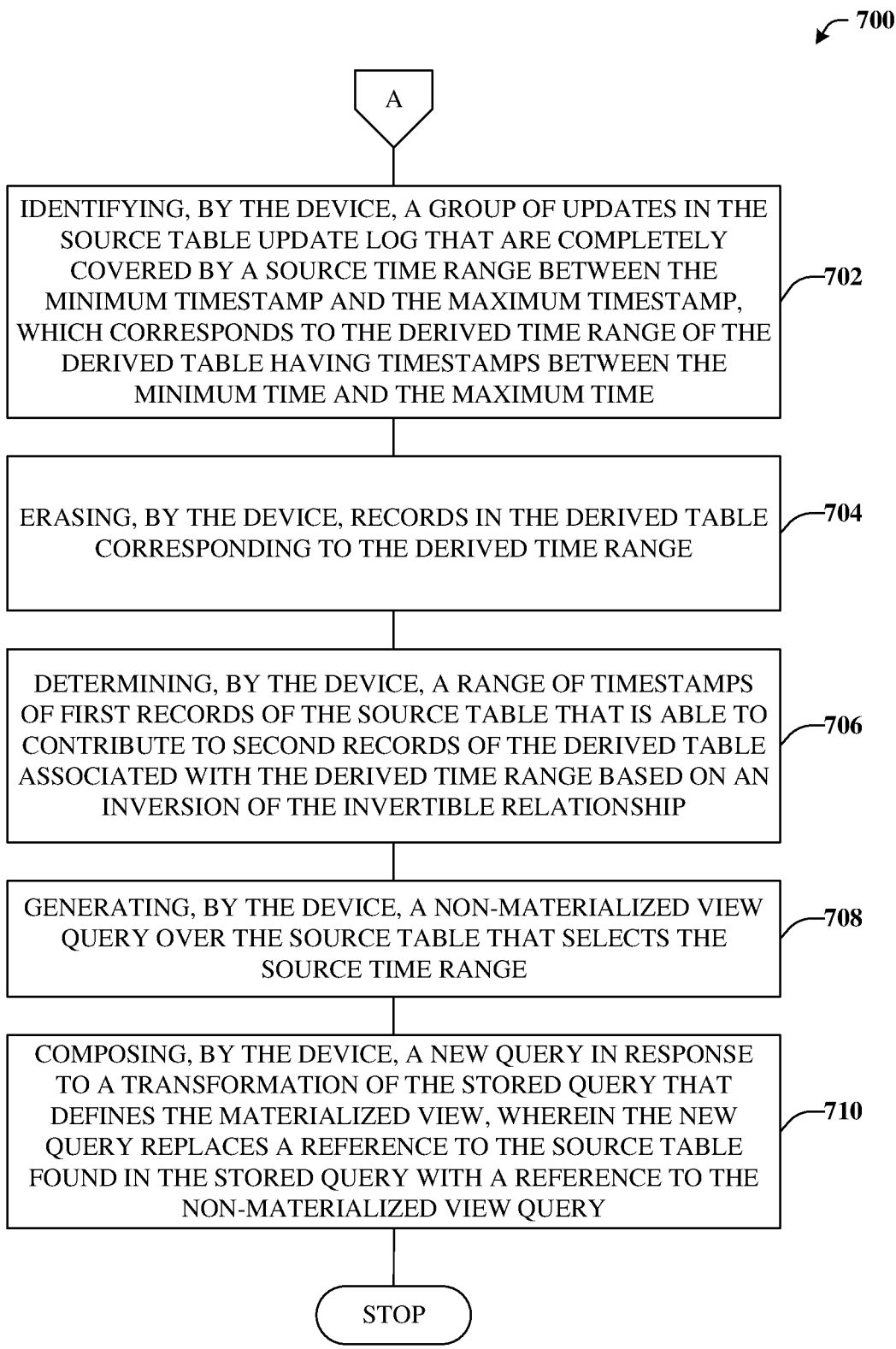
FIG. 7 illustrates an example method that can provide for additional elements or aspects in connection with determining portions of derived tables to recompute in response to source table updates in accordance with certain embodiments of this disclosure.

FIGS. 6 and 7 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

Turning now to FIG. 6, exemplary method 600 is depicted. Method 600 can determine portions of derived tables to recompute in response to source table updates in accordance with certain embodiments of this disclosure. For example, at reference numeral 602, a device comprising a processor can determine that a materialized view has produced a derived table. The materialized view can be representative of a stored query of a DBMS.

At reference numeral 604, the device can generate an update log or verify the existence or presence of the update log. The update log can be representative of a history of updates to the source table.

At reference numeral 606, the device can generate progress log or verify the existence or presence of the progress log. The progress log can be representative of a history of updates to the derived table resulting from processing of the updates to the update log of the source table.

At reference numeral 608, the device can determine an invertible relationship between a timestamp field of the source table and a timestamp field of the derived table.

At reference numeral 610, the device can perform an update propagation procedure. The update propagation procedure can determine a derived time range of the derived table to recompute in response to an update to the source table data. The update propagation procedure can comprise all or a portion of elements detailed in connection with reference numerals 612-616 as well as additional elements detailed in connection with reference numerals 702-710 of FIG. 7 or otherwise detailed herein.

At reference numeral 612, the device can convert a minimum timestamp of the update to a minimum time of the derived time range based on the invertible relationship.

At reference numeral 614, the device can convert a maximum timestamp of the update to a maximum time of the derived time range based on the invertible relationship.

At reference numeral 616, the device can perform a recompute procedure that recomputes the derived time range of the derived table. Method 600 can stop or proceed to insert A, which is further detailed in connection with FIG. 7.

With reference now to FIG. 7, exemplary method 700 is illustrated. Method 700 can provide for additional elements or aspects in connection with determining portions of derived tables to recompute in response to source table updates in accordance with certain embodiments of this disclosure.

For example, at reference numeral 702, the device can identify a group of updates in the source table update log that are completely covered by a source time range between the minimum timestamp and the maximum timestamp. This range can correspond to the derived time range of the derived table having timestamps between the minimum time and the maximum time that was detailed in connection with reference numeral 610 of FIG. 6.

At reference 704, the device can erase or delete records in the derived table corresponding to the derived time range. At reference numeral 706, the device can determine a range of timestamps of first records of the source table that is able to contribute to second records of the derived table associated with the derived time range based on an inversion of the invertible relationship. In other words, by inverting the invertible relationship, the first records can be identified.

At reference 708, the device can generate a non-materialized view query over the source table that selects the source time range. At reference 710, the device can compose a new query in response to a transformation of the stored query. For example the stored query can define the materialized view, whereas the new query replaces a reference to the source table found in the stored query with a reference to the non-materialized view query.

Example Operating Environments

Figure 8:
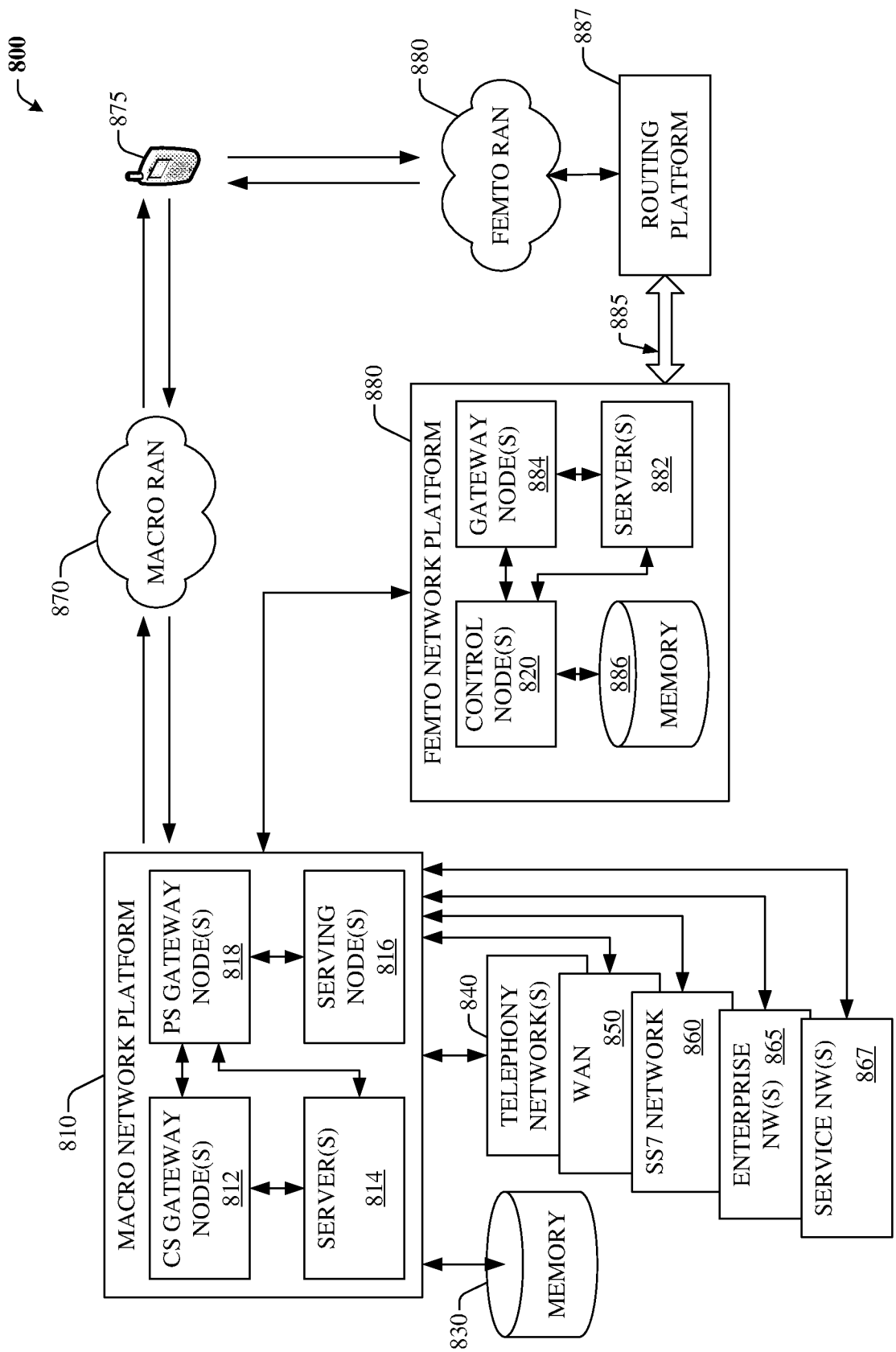
FIG. 8 illustrates a first example of a wireless communications environment with associated components that can be operable to execute certain embodiments of this disclosure.

To provide further context for various aspects of the subject specification, FIG. 8 illustrates an example wireless communication environment 800, with associated components that can enable operation of a femtocell enterprise network in accordance with aspects described herein. Wireless communication environment 800 comprises two wireless network platforms: (i) A macro network platform 810 that serves, or facilitates communication with, user equipment 875 via a macro radio access network (RAN) 870. It should be appreciated that in cellular wireless technologies (e.g., 4G, 3GPP UMTS, HSPA, 3GPP LTE, 3GPP UMB, 5G), macro network platform 810 is embodied in a Core Network. (ii) A femto network platform 880, which can provide communication with UE 875 through a femto RAN 890, linked to the femto network platform 880 through a routing platform 887 via backhaul pipe(s) 885. It should be appreciated that femto network platform 880 typically offloads UE 875 from macro network, once UE 875 attaches (e.g., through macro-to-femto handover, or via a scan of channel resources in idle mode) to femto RAN.

It is noted that RAN comprises base station(s), or access point(s), and its associated electronic circuitry and deployment site(s), in addition to a wireless radio link operated in accordance with the base station(s). Accordingly, macro RAN1370 can comprise various coverage cells, while femto RAN 890 can comprise multiple femto access points or multiple metro cell access points. As mentioned above, it is to be appreciated that deployment density in femto RAN 890 can be substantially higher than in macro RAN 870.

Generally, both macro and femto network platforms 810 and 880 comprise components, e.g., nodes, gateways, interfaces, servers, or platforms, that facilitate both packet-switched (PS) (e.g., internet protocol (IP), Ethernet, frame relay, asynchronous transfer mode (ATM)) and circuit-switched (CS) traffic (e.g., voice and data) and control generation for networked wireless communication. In an aspect of the subject innovation, macro network platform 810 comprises CS gateway node(s) 812 which can interface CS traffic received from legacy networks like telephony network(s) 840 (e.g., public switched telephone network (PSTN), or public land mobile network (PLMN)) or a SS7 network 860. Circuit switched gateway 812 can authorize and authenticate traffic (e.g., voice) arising from such networks. Additionally, CS gateway 812 can access mobility, or roaming, data generated through SS7 network 860; for instance, mobility data stored in a VLR, which can reside in memory 830. Moreover, CS gateway node(s) 812 interfaces CS-based traffic and signaling and gateway node(s) 818. As an example, in a 3GPP UMTS network, gateway node(s) 818 can be embodied in gateway GPRS support node(s) (GGSN).

In addition to receiving and processing CS-switched traffic and signaling, gateway node(s) 818 can authorize and authenticate PS-based data sessions with served (e.g., through macro RAN) wireless devices. Data sessions can comprise traffic exchange with networks external to the macro network platform 810, like wide area network(s) (WANs) 850; it should be appreciated that local area network(s) (LANs) can also be interfaced with macro network platform 810 through gateway node(s) 818. Gateway node(s) 818 generates packet data contexts when a data session is established. To that end, in an aspect, gateway node(s) 818 can comprise a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can comprise multiple flows that can be generated through server(s) 814. It is to be noted that in 3GPP UMTS network(s), gateway node(s) 818 (e.g., GGSN) and tunnel interface (e.g., TTG) comprise a packet data gateway (PDG).

Macro network platform 810 also comprises serving node(s) 816 that convey the various packetized flows of information or data streams, received through gateway node(s) 818. As an example, in a 3GPP UMTS network, serving node(s) can be embodied in serving GPRS support node(s) (SGSN).

As indicated above, server(s) 814 in macro network platform 810 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can comprise add-on features to standard services provided by macro network platform 810. Data streams can be conveyed to gateway node(s) 818 for authorization/authentication and initiation of a data session, and to serving node(s) 816 for communication thereafter. Server(s) 814 can also effect security (e.g., implement one or more firewalls) of macro network platform 810 to ensure network's operation and data integrity in addition to authorization and authentication procedures that CS gateway node(s) 812 and gateway node(s) 818 can enact. Moreover, server(s) 814 can provision services from external network(s), e.g., WAN 850, or Global Positioning System (GPS) network(s) (not shown). It is to be noted that server(s) 814 can comprise one or more processor configured to confer at least in part the functionality of macro network platform 810. To that end, the one or more processor can execute code instructions stored in memory 830, for example.

In example wireless environment 800, memory 830 stores information related to operation of macro network platform 810. Information can comprise business data associated with subscribers; market plans and strategies, e.g., promotional campaigns, business partnerships; operational data for mobile devices served through macro network platform; service and privacy policies; end-user service logs for law enforcement; and so forth. Memory 830 can also store information from at least one of telephony network(s) 840, WAN(s) 850, or SS7 network 860, enterprise NW(s) 865, or service NW(s) 867.

Femto gateway node(s) 884 have substantially the same functionality as PS gateway node(s) 818. Additionally, femto gateway node(s) 884 can also comprise substantially all functionality of serving node(s) 816. In an aspect, femto gateway node(s) 884 facilitates handover resolution, e.g., assessment and execution. Further, control node(s) 820 can receive handover requests and relay them to a handover component (not shown) via gateway node(s) 884. According to an aspect, control node(s) 820 can support RNC capabilities.

Server(s) 882 have substantially the same functionality as described in connection with server(s) 814. In an aspect, server(s) 882 can execute multiple application(s) that provide service (e.g., voice and data) to wireless devices served through femto RAN 890. Server(s) 882 can also provide security features to femto network platform. In addition, server(s) 882 can manage (e.g., schedule, queue, format . . . ) substantially all packetized flows (e.g., IP-based) it generates in addition to data received from macro network platform 810. It is to be noted that server(s) 882 can comprise one or more processor configured to confer at least in part the functionality of macro network platform 810. To that end, the one or more processor can execute code instructions stored in memory 886, for example.

Memory 886 can comprise information relevant to operation of the various components of femto network platform 880. For example, operational information that can be stored in memory 886 can comprise, but is not limited to, subscriber information; contracted services; maintenance and service records; femto cell configuration (e.g., devices served through femto RAN 890; access control lists, or white lists); service policies and specifications; privacy policies; add-on features; and so forth.

It is noted that femto network platform 880 and macro network platform 810 can be functionally connected through one or more reference link(s) or reference interface(s). In addition, femto network platform 880 can be functionally coupled directly (not illustrated) to one or more of external network(s) 840, 850, 860, 865 or 867. Reference link(s) or interface(s) can functionally link at least one of gateway node(s) 884 or server(s) 886 to the one or more external networks 840, 850, 860, 865 or 867.

Figure 9:
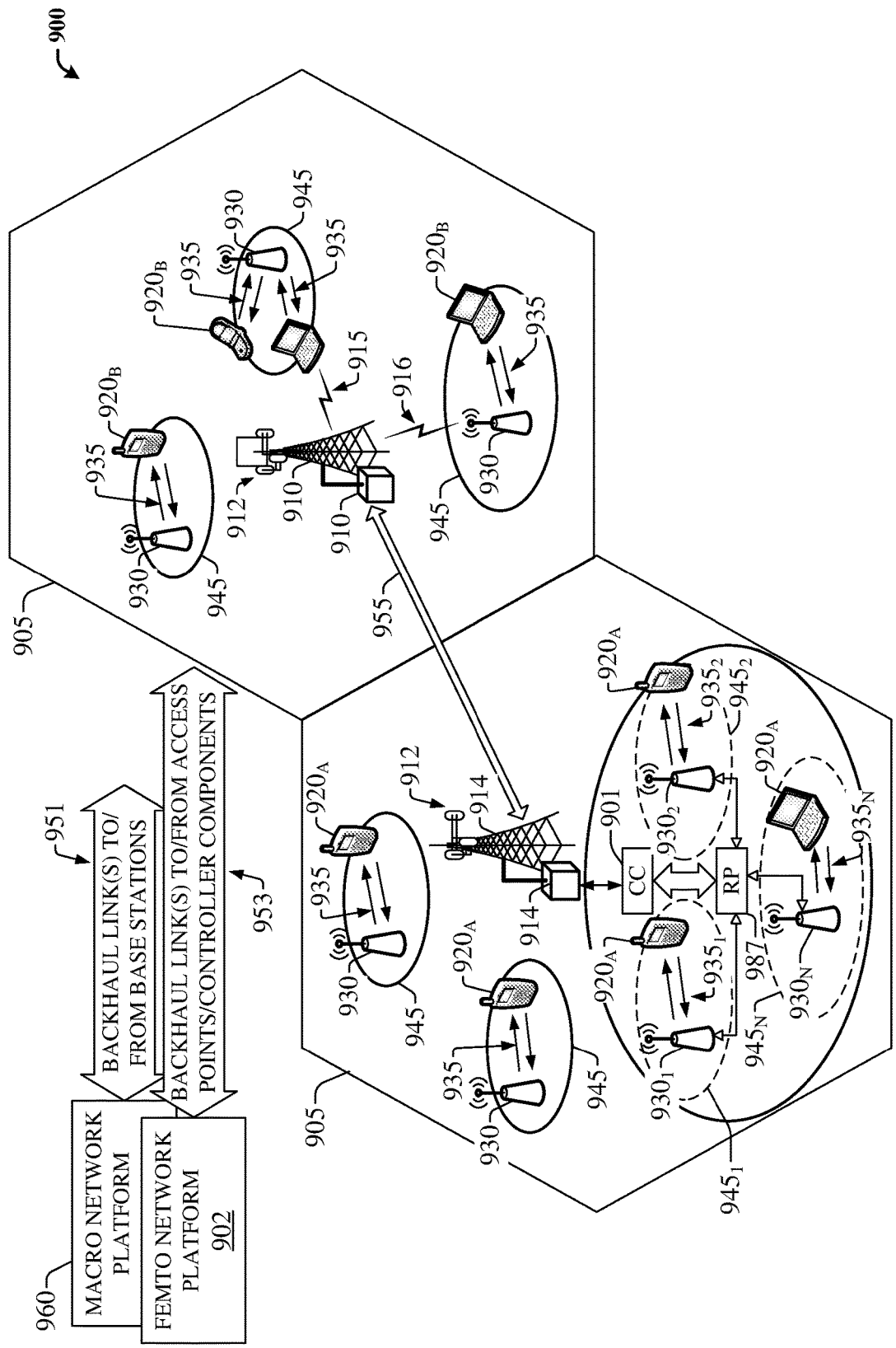
FIG. 9 illustrates a second example of a wireless communications environment with associated components that can be operable to execute certain embodiments of this disclosure.

FIG. 9 illustrates a wireless environment that comprises macro cells and femtocells for wireless coverage in accordance with aspects described herein. In wireless environment 905, two areas represent "macro" cell coverage; each macro cell is served by a base station 910. It can be appreciated that macro cell coverage area 905 and base station 910 can comprise functionality, as more fully described herein, for example, with regard to system 900. Macro coverage is generally intended to serve mobile wireless devices, like UE $920_A$, $920_B$, in outdoors locations. An over-the-air (OTA) wireless link 935 provides such coverage, the wireless link 935 comprises a downlink (DL) and an uplink (UL), and utilizes a predetermined band, licensed or unlicensed, of the radio frequency (RF) spectrum. As an example, UE $920_A$, $920_B$ can be a 3GPP Universal Mobile Telecommunication System (UMTS) mobile phone. It is noted that a set of base stations, its associated electronics, circuitry or components, base stations control component(s), and wireless links operated in accordance to respective base stations in the set of base stations form a radio access network (RAN). In addition, base station 910 communicates via backhaul link(s) 951 with a macro network platform 960, which in cellular wireless technologies (e.g., 3rd Generation Partnership Project (3GPP) Universal Mobile Telecommunication System (UMTS), Global System for Mobile Communication (GSM)) represents a core network.

In an aspect, macro network platform 960 controls a set of base stations 910 that serve either respective cells or a number of sectors within such cells. Base station 910 comprises radio equipment 914 for operation in one or more radio technologies, and a set of antennas 912 (e.g., smart antennas, microwave antennas, satellite dish(es) . . . ) that can serve one or more sectors within a macro cell 905. It is noted that a set of radio network control node(s), which can be a part of macro network platform 960; a set of base stations (e.g., Node B 910) that serve a set of macro cells 905; electronics, circuitry or components associated with the base stations in the set of base stations; a set of respective OTA wireless links (e.g., links 915 or 916) operated in accordance to a radio technology through the base stations; and backhaul link(s) 955 and 951 form a macro radio access network (RAN). Macro network platform 960 also communicates with other base stations (not shown) that serve other cells (not shown). Backhaul link(s) 951 or 953 can comprise a wired backbone link (e.g., optical fiber backbone, twisted-pair line, T1/E1 phone line, a digital subscriber line (DSL) either synchronous or asynchronous, an asymmetric ADSL, or a coaxial cable . . . ) or a wireless (e.g., LoS or non-LoS) backbone link. Backhaul pipe(s) 955 link disparate base stations 910. According to an aspect, backhaul link 953 can connect multiple femto access points 930 and/or controller components (CC) 901 to the femto network platform 902. In one example, multiple femto APs can be connected to a routing platform (RP) 987, which in turn can be connect to a controller component (CC) 901. Typically, the information from UEs $920_A$ can be routed by the RP 987, for example, internally, to another UE $920_A$ connected to a disparate femto AP connected to the RP 987, or, externally, to the femto network platform 902 via the CC 901, as discussed in detail supra.

In wireless environment 905, within one or more macro cell(s) 905, a set of femtocells 945 served by respective femto access points (APs) 930 can be deployed. It can be appreciated that, aspects of the subject innovation can be geared to femtocell deployments with substantive femto AP density, e.g., $9^4$-$10^7$ femto APs 930 per base station 910. According to an aspect, a set of femto access points $930_1$-$930_N$, with N a natural number, can be functionally connected to a routing platform 987, which can be functionally coupled to a controller component 901. The controller component 901 can be operationally linked to the femto network platform 902 by employing backhaul link(s) 953. Accordingly, UE $920_A$ connected to femto APs $930_1$-$930_N$ can communicate internally within the femto enterprise via the routing platform (RP) 987 and/or can also communicate with the femto network platform 902 via the RP 987, controller component 901 and the backhaul link(s) 953. It can be appreciated that although only one femto enterprise is depicted in FIG. 9, multiple femto enterprise networks can be deployed within a macro cell 905.

It is noted that while various aspects, features, or advantages described herein have been illustrated through femto access point(s) and associated femto coverage, such aspects and features also can be exploited for home access point(s) (HAPs) that provide wireless coverage through substantially any, or any, disparate telecommunication technologies, such as for example Wi-Fi (wireless fidelity) or picocell telecommunication. Additionally, aspects, features, or advantages of the subject innovation can be exploited in substantially any wireless telecommunication, or radio, technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Moreover, substantially all aspects of the subject innovation can comprise legacy telecommunication technologies.

With respect to FIG. 9, in example embodiment 900, base station AP 910 can receive and transmit signal(s) (e.g., traffic and control signals) from and to wireless devices, access terminals, wireless ports and routers, etc., through a set of antennas $912_1$-$912_N$. It should be appreciated that while antennas $912_1$-$912_N$ are a part of communication platform 925, which comprises electronic components and associated circuitry that provides for processing and manipulating of received signal(s) (e.g., a packet flow) and signal(s) (e.g., a broadcast control channel) to be transmitted. In an aspect, communication platform 925 comprises a transmitter/receiver (e.g., a transceiver) 966 that can convert signal(s) from analog format to digital format upon reception, and from digital format to analog format upon transmission. In addition, receiver/transmitter 966 can divide a single data stream into multiple, parallel data streams, or perform the reciprocal operation. Coupled to transceiver 966 is a multiplexer/demultiplexer 967 that facilitates manipulation of signal in time and frequency space. Electronic component 967 can multiplex information (data/traffic and control/signaling) according to various multiplexing schemes such as time division multiplexing (TDM), frequency division multiplexing (FUM), orthogonal frequency division multiplexing (OFDM), code division multiplexing (CDM), space division multiplexing (SDM). In addition, mux/demux component 967 can scramble and spread information (e.g., codes) according to substantially any code known in the art; e.g., Hadamard-Walsh codes, Baker codes, Kasami codes, polyphase codes, and so on. A modulator/demodulator 968 is also a part of operational group 925, and can modulate information according to multiple modulation techniques, such as frequency modulation, amplitude modulation (e.g., M-ary quadrature amplitude modulation (QAM), with M a positive integer), phase-shift keying (PSK), and the like.

Figure 10:
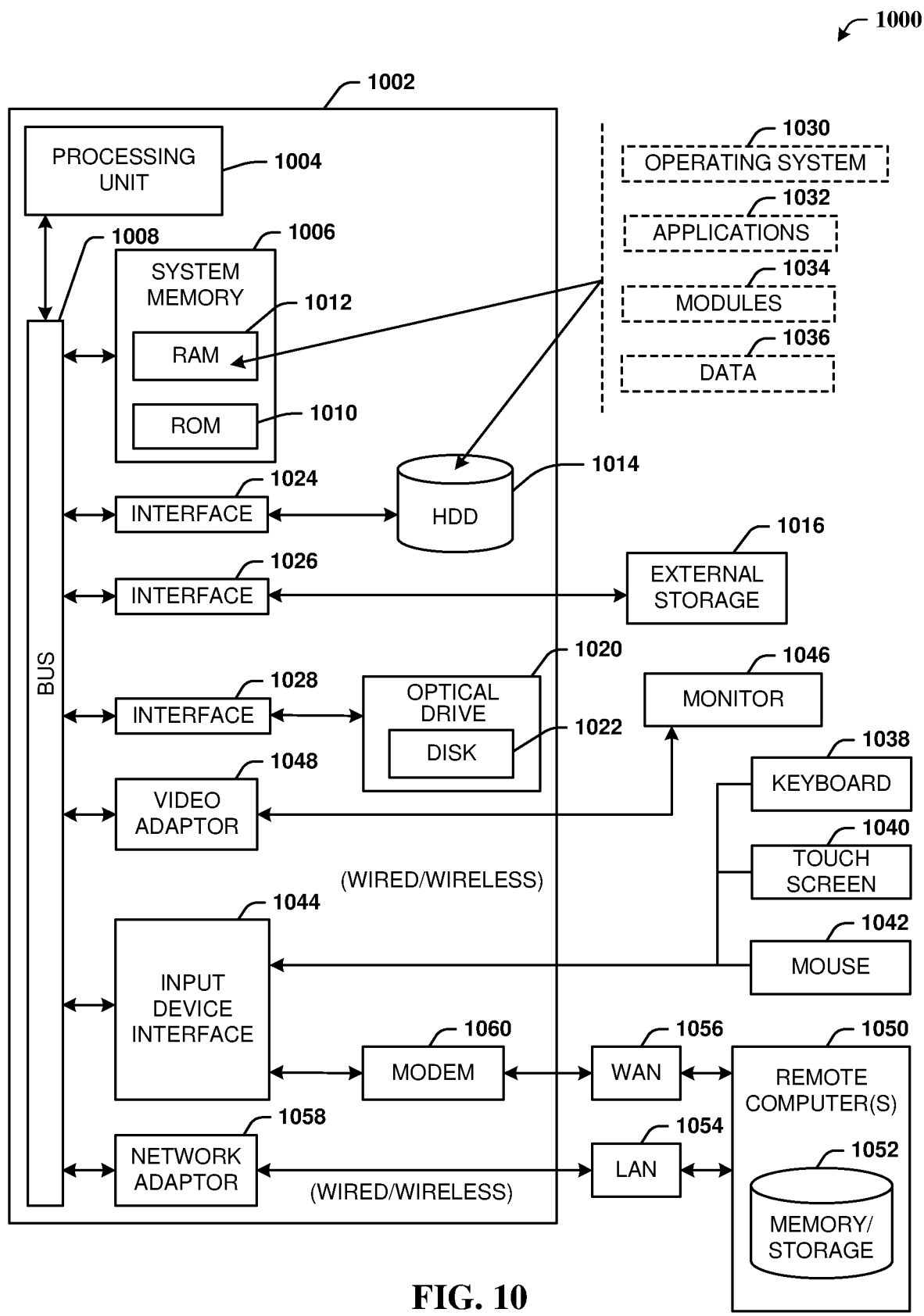
FIG. 10 illustrates an example block diagram of a computer operable to execute certain embodiments of this disclosure.

Referring now to FIG. 10, there is illustrated a block diagram of an exemplary computer system operable to execute the disclosed architecture. In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This comprises at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

What has been described above comprises examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from by a computing device.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," "station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any datastream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

What is claimed is:

1. A device, comprising:
    a processor; and
    a memory that stores executable instructions that, when executed by the processor, facilitate performance of operations, the operations comprising:
        determining that a materialized view, representative of a stored query of a database system, has produced a derived table that stores derived table data derived from a source table that stores source table data;
        generating an update log representative of a first history of first updates to the source table;
        generating a progress log representative of a second history of second updates to the derived table resulting from the first updates that have been processed;
        determining a relationship between a source table timestamp field and a derived table timestamp field; and
        in response to a determination that an update has occurred to the source table data, performing an update propagation procedure that determines a portion of the derived table to be recomputed in response to the update to the source table data, the update propagation procedure comprising:
            performing a coalesce procedure that combines the update with other updates to the source table data, resulting in a coalesced update;
            converting, based on the relationship, a minimum timestamp of the coalesced update to a minimum time, and a maximum timestamp of the coalesced update to a maximum time; and
            performing a recompute procedure that recomputes the portion of the derived table having timestamps between the minimum time and the maximum time.

2. The device of claim 1, wherein the source table is one of a group comprising a base table and a previously derived table.

3. The device of claim 2, wherein the operations further comprise generating a base progress log for the base table, and wherein the base progress log records associated source files that have been applied.

4. The device of claim 1, wherein the determination that the update has occurred is in response to a determination that the update exists in the update log of the source table and does not exist in the progress log of the derived table.

5. The device of claim 1, wherein the relationship between the source table timestamp field and the derived table timestamp field is invertible, enabling an inverse transform to be specified without requiring a reverse relationship to be specified.

6. The device of claim 5, wherein the relationship is one of a group comprising: a shift transformation relationship, a scale transformation relationship, an offset transformation relationship, and a bucket transformation relationship.

7. The device of claim 1, wherein the coalesce procedure combines the update in response to the update and the other updates other than the update having an overlap in timestamp ranges.

8. The device of claim 1, wherein the recompute procedure comprises:
    identifying a collection of updates in the source table update log that are completely covered by a time range between the minimum timestamp and the maximum timestamp, which corresponds, according to the relationship, to the portion of the derived table having timestamps between the minimum time and the maximum time;

deleting records in the derived table corresponding to the portion;

in response to inverting the relationship, determining a range of timestamps of first records of the source table that is able to contribute to second records of the derived table associated with the portion; and generating a non-materialized view query over the source table that selects the time range.

9. The device of claim 8, wherein the stored query is a first stored query, and wherein the recompute procedure comprises transforming the first stored query that defines the materialized view to a second stored query other than the first stored query.

10. The device of claim 9, wherein the second stored query replaces a first reference to the source table in the stored query with a second reference to the non-materialized view query.

11. The device of claim 10, wherein the second stored query inserts selections corresponding to the portion.

12. The device of claim 8, wherein the recompute procedure comprises:
   executing the second stored query; and
   updating appropriate source logs and progress logs.

13. A non-transitory machine-readable medium, comprising executable instructions that, when executed by a processor of a device, facilitate performance of operations, comprising:
   determining that a materialized view, representative of a stored query of a database system, has produced a derived table that stores derived table data derived from a source table that stores source table data;
   creating an update log representative of first updates to the source table;
   creating a progress log representative of second updates to the derived table resulting from the first updates;
   determining an invertible relationship between a source table timestamp field and a derived table timestamp field; and
   performing an update propagation procedure that determines a derived time range of the derived table to recomputed in response to an update to the source table data, the update propagation procedure comprising:
      converting, based on the invertible relationship, a lower limit timestamp of the update to a lower limit time of the derived time range;
      converting, based on the invertible relationship, an upper limit timestamp of the update to an upper limit time of the derived time range; and;
      performing a recompute procedure that recomputes the derived time range of the derived table.

14. The non-transitory machine-readable medium of claim 13, wherein the operations further comprise:
   identifying a group of updates in the source table update log that are completely covered by a source time range between the lower limit timestamp and the upper limit timestamp, which corresponds to the derived time range of the derived table having timestamps between the lower limit time and the upper limit time;
   deleting records in the derived table corresponding to the derived time range;
   in response to inverting the invertible relationship, determining a range of timestamps of first records of the source table that is able to contribute to second records of the derived table associated with the derived time range; and
   generating a non-materialized view query over the source table that selects the source time range.

15. The non-transitory machine-readable medium of claim 13, wherein the non-materialized view query produces a non-materialized view that operates as a source for the derived table with a group of defined transformation parameters.

16. The non-transitory machine-readable medium of claim 15, wherein the operations further comprise adding a dependency of the derived table on the source table with the composition of the defined transformation parameters associated with the non-materialized view.

17. A method, comprising:
   determining, by a device comprising a processor, that a materialized view, representative of a stored query of a database system, has produced a derived table that stores derived table data derived from a source table that stores source table data;
   generating, by the device, an update log representative of first updates to the source table;
   generating, by the device, a progress log representative of second updates to the derived table that result from processing of the first updates;
   determining, by the device, an invertible relationship between a source table timestamp field and a derived table timestamp field; and
   performing, by the device, an update propagation procedure that determines a derived time range of the derived table to recompute in response to an update to the source table data, the update propagation procedure comprising:
      converting, by the device, a minimum timestamp of the update to a minimum time of the derived time range based on the invertible relationship;
      converting, by the device, a maximum timestamp of the update to a maximum time of the derived time range based on the invertible relationship; and;
      performing, by the device, a recompute procedure that recomputes the derived time range of the derived table.

18. The method of claim 17, further comprising:
   identifying, by the device, a group of updates in the source table update log that are completely covered by a source time range between the minimum timestamp and the maximum timestamp, which corresponds to the derived time range of the derived table having timestamps between the minimum time and the maximum time; and
   erasing, by the device, records in the derived table corresponding to the derived time range.

19. The method of claim 18, further comprising:
   determining, by the device, a range of timestamps of first records of the source table that is able to contribute to second records of the derived table associated with the derived time range based on an inversion of the invertible relationship; and
   generating, by the device, a non-materialized view query over the source table that selects the source time range.

20. The method of claim 19, further comprising composing, by the device, a new query in response to a transformation of the stored query that defines the materialized view, wherein the new query replaces a reference to the source table found in the stored query with a reference to the non-materialized view query.

* * * * *